United States Patent
Treadwell

[15] 3,635,821
[45] Jan. 18, 1972

[54] FLAME RETARDANT COMPOSITIONS COMPRISING AN INERT FILLER, A HALOGEN SOURCE AND A PHOSPHORUS-CONTAINING COMPOUND AND METHODS FOR THEIR PREPARATION

[72] Inventor: Kenneth Treadwell, Rahway, N.J.
[73] Assignee: M & T Chemicals Inc., New York, N.Y.
[22] Filed: July 23, 1969
[21] Appl. No.: 844,179

[52] U.S. Cl..........................252/8.1, 117/100 B, 117/100 S, 260/2.5 AJ, 260/2.5 FP, 260/37 R, 260/45.7 P, 260/DIG. 24
[51] Int. Cl. .........................................C09k 3/28, B44d 1/16
[58] Field of Search..................252/8.1; 260/2.5 AJ, 2.5 FP, 260/DIG. 24, 45.7 P, 37 R; 106/15 FP, 100 BS, 15; 117/137, 100 B, 100 S

[56] References Cited

UNITED STATES PATENTS

| | | | |
|---|---|---|---|
| 2,378,714 | 6/1945 | Leatherman | 252/8.1 |
| 2,669,521 | 2/1954 | Bierly | 106/15 |
| 3,262,894 | 7/1966 | Green | 260/2.5 |
| 3,330,783 | 7/1967 | Piechota et al. | 260/2.5 |
| 3,333,970 | 8/1967 | Green | 106/15 |
| 3,356,635 | 12/1967 | Heer | 260/37 |
| 3,455,850 | 7/1969 | Saunders | 252/8.1 |
| 3,470,094 | 9/1969 | Zimmerman et al. | 252/8.1 |
| 3,513,119 | 5/1970 | Cannelongo | 106/15 |

Primary Examiner—John T. Goolkasian
Assistant Examiner—D. J. Fritsch
Attorney—Lewis C. Brown, Kenneth G. Wheeless and Robert P. Grindle

[57] ABSTRACT

A flame-retardant system is provided for polyurethane foams comprising an inert filler, a halogen source and a phosphorus-containing compound, and, also, urethane foam compositions containing the flame-retardant systems. In addition, methods are provided for making the systems including coating the individual particles of the filler with a composition containing the halogen source, and thereafter adhering the phosphorus-containing compound to the coated particles, and also, methods for making the flame-retardant urethane foam compositions.

17 Claims, No Drawings

FLAME RETARDANT COMPOSITIONS COMPRISING AN INERT FILLER, A HALOGEN SOURCE AND A PHOSPHORUS-CONTAINING COMPOUND AND METHODS FOR THEIR PREPARATION

Generally speaking, this invention relates to flame-retardant systems for urethane foams, and to the method for preparing them. More particularly, this invention relates to flame-retardant systems including an inert filler, a halogen source, and a phosphorus-containing compound, and to urethane foams flame retarded with such systems.

With the ever-increasing use of urethanes in all phases of our economy, there is a corresponding concern with regard to their use in conjunction with fire prevention. Urethanes involving the utilization of antimony trioxide in various forms as a flame retardant are well known and form the subject matter of a large variety of industrial processes and applications. In addition, various other applications are taught for flame-retarding urethanes such as individual components including chlorinated phosphate esters, aluminum flakes which have the surface characteristics thereof changed for incorporation into urethane foams, combinations of antimony compounds and phosphorus-containing compounds, and phosphorus-containing compounds individually.

Urethanes are being used increasingly as foamed products for use in insulation, particularly in buildings of all kinds merely because a large quantity of such insulation may be applied rapidly by the use of mechanical devices as opposed to the relatively slow application of insulation in the past by individual laborers. This is most important in the building industry today because of the cost of labor. The polyurethanes as discussed herein are high molecular weight compounds containing a plurality of urethane or analogous linkages. One such group of compounds which are coming into large-scale commercial use at the present time are the polyurethane foams, as noted above.

The polyurethane foams are generally formed from compositions which include polymer-containing free hydroxy groups, such as hydroxyl-terminated polyester or polyether, an organic diisocyanate, and a small amount of water. For the best results, a catalyst, preferably an amine catalyst, a tin catalyst and an emulsifier are also included. Such compositions may be foamed and otherwise treated in a manner known in the art to produce the desired cellular product.

As noted above, because of the desire to use these urethane foams in large quantities for building insulation, there has been much development with flame-retardant additives for the foams. However, whereas the additives used in the past served admirably to flame-retard, they still have a tendency to ignite even for a short period of time and thus increase the possibility of spreading flame and/or initiating flame from heat sources in a building structure.

Certain other difficulties may arise from the use of the prior art flame-retardant additives in that they may reduce the mechanical strength and/or stability of the urethane foams so that they might not prove satisfactory for such uses and/or applications where the final urethane foam is to serve as a cushion or base, or in some other manner provide mechanical stability for a structure in which the foams are to be incorporated. Also, problems may arise with the use of certain additives in that the additives themselves prove unsatisfactory, and as giving the final urethane foams moisture-absorbing qualities thus reducing the usefulness of the foams in certain applications and essentially reducing the life of the foams in the first place.

By contrast, and quite unexpectedly, it has now been found in accordance with this invention that urethane foams can be effectively flame retarded even to the extent where they do not support an initial flame by the incorporation in said foams of a flame-retardant system comprising an inert filler, a halogen source and a phosphorus-containing compound. This three-component system is prepared in accordance with a method as described herein and added to a urethane foam formulation for forming the final polyurethane foam.

The inert filler which may be used in accordance herewith may be selected from any of the well-known inert fillers used as additives for resin compositions and including staurolite, perlite (any naturally occurring glass of igneous origin that will expand, when quickly heated to yield a frothy, light-colored mass of glass bubbles), a silicon dioxide sand, a fused glass composition of antimony trioxide or a combination of antimony trioxide and a borate, aluminum silicate, antimony pentoxide, zircon, barytes or colemanite. The halogen source may be a chlorinated paraffin such as Chlorowax 70, (a chlorinated paraffin containing 70 percent chlorine manufactured by Diamond-Shamrock Chemical Company), Dechlorane (a brand of perchloropentacyclodecane ($C_{10}CL_{12}$) having a melting point of 485° C. and manufactured by Hooker Chemical Company), and Dechlorane + (a brand of perchloropentacycloclecane containing a melting point depressant and with a melting point of 350° C. and manufactured by Hooker Chemical Company). Also, chlorinated polyethylenes and polyvinyl chloride may be used as well as brominated systems using bromophenols, for example.

The phosphorus-containing compound may be any phosphorus-containing compound such as, for example, hydrated calcium phosphate, ammonium phosphate, triphenyl phosphine oxide, tricresyl phosphate and halogenated phosphates.

As purely illustrative of a method for preparing the flame-retardant system herein, generally the inorganic filler is charged to a mixer and heated. Thereafter, the halogenated paraffin is added to the mixer so as to coat the individual particles of the inorganic filler with the paraffin, with the heat being raised simultaneously up to a range of the softening point of the halogenated paraffin. Thereafter, the phosphorus-containing compound is added and because the individual particles of the inert filler are coated, the phosphorus-containing compound adheres readily to the coated particles. However, it may be appropriate in certain instances and depending upon the ultimate characteristics desired to charge all three components to a mixture without the addition of heat with the only requirement being that the three components are thoroughly mixed. It is to be understood, further, that it is within the purview of the method as taught herein that certain substitutents may be added to the mixing zone in which the three-component system in accordance herewith is prepared to enhance the compatibility of the components with each other, or otherwise improve the mixing thereof. For example, certain substituents such as expanded ores, diatomaceous earths and fumed silicas may be added for such purposes as avoiding agglomeration during the mixing process.

The resulting product from either method provides a three-component system in which the individual particles of the system each contain the three components and provide for even distribution of the individual components of the system throughout the urethane foam compositions when it is incorporated therein. Such an arrangement imparts to polyurethane compositions a high degree of flame retardancy and low moisture retention characteristics, while avoiding change in the heat transfer coefficient and without imparting at the same time any reduction in the stability or strength characteristics of the urethane foam.

In addition, it has been found, in accordance herewith, that the flame retardancy characteristics of the final urethane foam compositions are enhanced to the extent where the urethane foams do not even sustain initial or incipient flame when an outside flame is applied directly thereto. In addition, by means of the present invention, urethane compositions classified as either self-extinguishing or nonburning in the ASTM D-1692 flammability test are readily prepared which thus broadens considerably their realm of practical utility.

The term "flame-resistant" as employed herein is used to characterize a material which does not burn readily. The terms "burning," "self-extinguishing" and "nonburning" are defined in accordance with the "Tentative Method of Test for Flammability of Plastic Foams and Sheeting," ASTM D-1692-7-T.

In this test, the flame of a Bunsen burner having a blue cone of about 1½ inches in height, is applied separately to the front edge of 10 foam specimens, 6"×2"×½" and allowed to remain in contact therewith for a period of 60 seconds. The extent of burning is considered the furthermost point reached by the flame front whereas the burning rate in inches per minutes is a measure of the time necessary for the time front to consume 5 inches of the foam specimen. A sample is judged "nonburning" if no evidence of ignition, such as flame or progressive glow, is seen in each specimen after removal of the flame. If the flame front of two or more specimens reaches the 5-inch mark the sample is judged "burning." A sample is judged "self-extinguishing" when ignition of the 10 specimens gives an extent of burning less than 5 inches.

Accordingly, it is one object of this invention to produce flame-retardant systems for urethane foams as derived herein which systems are selected to provide enhanced flame-retardant characteristics to the foams, considerably improved over the prior art flame-retardant additives. In addition, it is another object of this invention to produce such flame-retardant systems which produce effective flame retardancy while simultaneously not affecting the stability or strength of the foamed urethane.

It is a further object of this invention to provide a method for producing such flame-retardant systems and to a method for producing urethane foams classified as "nonburning" and having incorporated therein the flame-retardancy systems, in accordance herewith while simultaneously avoiding change in the heat transfer coefficient. Furthermore, it is a further object of this invention that flame-retardant urethane foam compositions are produced which have low moisture absorption characteristics. Also, the systems herein are readily usable in existing equipment.

With the foregoing and additional objects in view, this invention will be described in more detail and other objects and advantages will be apparent from the following description and the appended claims.

As purely illustrative of satisfactory results achieved in accordance herewith, and under satisfactorily and economically attractive conditions on commercial scale operations a flame-retardant system is formulated by charging in amounts by weight 100 parts of an inorganic filler to a Henschel Mixer and heating the filler to 50° C. Thereafter, 50 parts of the halogenated paraffin is added to the mixer and the heat is raised to between about 70° and 75° C., the softening point of the halogenated paraffin, at which point the individual particles of the inorganic filler are coated with the paraffin. Thereafter, 20 parts of a phosphorus-containing compound are added and the phosphorus-containing compound adheres to the coated inorganic particles, and thereafter the three-component flame-retardant composition is introduced into a mixture prepared for formulating a rigid urethane foam.

In considering generally the conditions for achieving the most enhanced results in connection herewith, which conditions are more specifically set forth below, one may note that satisfactory flame-retarded urethane compositions are realized by introducing into the particular desired urethane composition an amount of the particular flame-retardant system in accordance herewith so that the phosphorus content in the final urethane foam is within the range of between about 0.5–5 percent by weight.

A preferred cycle of operation, in accordance herewith, for formulating the particular flame-retardant system includes admixing as the inert filler Staurolite 60 (a product of M&T Chemicals Inc. and being a concentration of the mineral staurolite plus constant minor portions of other minerals such as kyanite, zircon, tourmaline, spinel, etc.) in the amount of between about 50–60 percent by weight of the final flame-retardant system composition and preferably 58 percent, Chlorowax 70 in the amount of between about 25–30 percent by weight of the final composition, and preferably 29 percent, and between about 10–15 percent by weight of the final composition of hydrated calcium phosphate, and preferably 12 percent. In addition, a small portion of an antimony oxide may be added in the amount of between about 2–5 percent for certain purposes although the addition is not preferred. Thereafter, the flame-retardant system is added to a representative urethane foam formulation, as noted below, in an amount sufficient so that the content of phosphorus in the final polyurethane foam is within the range of between about 0.5–5 percent, and preferably 1.5 percent.

As purely illustrative of a rigid urethane foam formulation which may be used in accordance herewith and into which the above noted flame-retardant system may be incorporated one may note the following composition:

| A. poly functional polyoxy propylene polymer based on methyl glucoside | 100.0 grams |
|---|---|
| B. polymethylene polyphenylisocyanate | 109.0 grams |
| C. dimethyl ethanol amine | 1.0 gram |
| D. dibutyltin dilaurate | 1.0 gram |
| E. a dimethylsiloxy-siloxane-type surfactant | 1.5 grams |
| F. trichlorofluoromethane (as an auxiliary blowing agent) | 37.0 grams |

In order to make a comparison between a urethane foam prepared with the above-noted formulation and without having the flame-retardant system in accordance herewith incorporated therein, two urethane foam specimens were prepared, one without the flame-retardant system in accordance herewith, and one with the flame-retardant system in accordance herewith. In this connection, a flame-retardant system was prepared containing 100 grams of Staurolite 60, 50 grams of Chlorowax 70, and 20 grams of hydrated calcium phosphate, in accordance with the method as noted above. Thereafter, two urethane foam examples were prepared using the formulation noted above.

In this example, ingredients A, C, D, E and F, noted above were thoroughly mixed and thereafter, the flame-retardant system in accordance herewith was added and the foam prepared in the usual manner by the addition of the isocyanate, (B), agitation for a short period of time, and then introduction of the mixture into a closed mold lined with kraft paper. After the foams reach peak height, the forms are placed in an oven and the molds removed. The foams are postcured for a period of time at a temperature of about 250° F. (121° C.).

Specimens were prepared from the two foams made and tested in accordance with the Bureau of Mines Torch Test noted above. The control sample containing no flame-retardant system as in accordance herewith had a torch test burn-through time of 30 seconds, whereas with the flame-retardant system in accordance herewith the burn-through time was 2,271 seconds.

As purely illustrative of the high flame-retardant results achieved in accordance herewith, a plurality of specimens were prepared with each containing the same ingredients and portions of ingredients of the urethane foam composition noted above, but with some of the examples containing no flame retardant, whereas other ones contained one or two of the three ingredients forming the flame-retardant system in accordance herewith and as exemplary of some prior art flame-retarding additives.

In table I, the results of the examples may be noted, in which the term "control" designates the urethane foam composition noted above, with the classification designations (B–burning, SE–self-extinguishing, NB–nonburning) being those according to ASTM Test D-1692 noted above, and with each of the specimens being prepared in accordance with the provisions of that test. It is to be understood, however, that these examples are being presented with the understanding that they are to have no limiting character on the broad disclosure of the invention as generally set forth herein and as directed to men skilled in the art.

Specimen No. 8 is the control having contained therein a preferred mixture of the flame-retardant system in accordance herewith of 100 grams of Staurolite 60, 50 grams of Chlorowax 70, and 20 grams of hydrated calcium phosphate

TABLE I

| Contents | 1 Control | 2 Control plus Staurolite "60" | 3 Control plus calcium phosphate dibasic | 4 Control plus Chlorowax "70" | 5 Control plus Staurolite "60" plus calcium phosphate dibasic | 6 Control plus Staurolite "60" plus Chlorowax "70" | 7 Control plus Chlorowax "60" plus calcium phosphate dibasic | 8 3 component flame retardant system plus control |
| --- | --- | --- | --- | --- | --- | --- | --- | --- |
| Ignition burn-time to 1", sec | 10 | 24.6 | 20.0 | 26.6 | 25.3 | 60.0 | 60.0 | 60.0 |
| Burn-time after ignition, sec | 32.3 | 41.5 | 39.0 | 19.3 | 55.3 | 35.9 | 29.6 | 00.0 |
| Percent weight retained | 45.4 | 73.3 | 59.4 | 89.2 | 76.4 | 94.3 | 49.9 | 98.4 |
| Classification | B | B | B | S.E. | B | S.E. | S.E. | N.B. |

$CaHPO_4 \cdot 2H_2O$. As is readily apparent, significant results are achieved in that there was absolutely no "burn-time" after ignition with 98.4 percent by weight of the foam being retained and the classification being "nonburning."

As purely illustrative of further results achieved utilizing the formulas noted, but with different phosphorus-containing compounds such as ammonium phosphate and triphenyl phosphine oxide to evaluate the flame-retardant properties of the systems containing those two phosphorus compounds, one may note the results listed in table II. In these examples, silicon dioxide sand was used as the inert filler for the flame-retardant system.

TABLE II

| | Control | 1 | 2 |
| --- | --- | --- | --- |
| Formulae, grams: | | | |
| Poly (i-435-1)M-(a poly functional polyoxy propylene polymer based on methyl glucoside -Olin Chemicals) | 100.0 | 100.0 | 100.0 |
| Papi-(polymethylene poly phenylisocyanate manufactured by The Carwin Company) | 109.0 | 109.0 | 109.0 |
| DC-193-(a dimethylsiloxy-siloxane type surfactant by Dow Corning) | 1.5 | 1.5 | 1.5 |
| Dimethyl ethanol amine | 1.0 | 1.0 | 1.0 |
| Dibutyltin dilaurate | 1.0 | 1.0 | 1.0 |
| Trichlorofluoromethane | 37.0 | 37.0 | 37.0 |
| Silicon dioxide sand | | 100.0 | 100.0 |
| Chlorowax 70 | | 50.0 | 50.0 |
| Ammonium phosphate | | 20.0 | |
| Triphenyl phosphine oxide | | | 20.0 |
| Time to burn through (sec.) | 28.0 | 3,214.0 | 3,476.8 |
| Burn time (sec.) to 1" mark | 24.0 | 60.0 | 60.0 |
| Burn time (sec.) after 1" mark | 41.5 | 0 | 0 |
| Percent weight retained | 73.3 | 91.0 | 86.9 |
| Length of burn (inches) | 4 | 0 | 0 |
| Classification | (1) | (2) | (2) |

[1] Burning.  [2] Non-burning.

As can be seen, the flame retardancy of the control example is greatly enhanced by the addition of the flame-retardant additive systems, in accordance herewith. In this connection, it should be noted that the ASTM Test D-1692-67-T was used to make the comparisons shown in table II.

Accordingly, and as will be apparent from the foregoing, there are provided in accordance herewith, methods and compositions for imparting flame retardancy to urethane resins while simultaneously maintaining a desired level of stability, and strength to the final flame-retarded compositions. In addition, low moisture retention and absorption characteristics are maintained while avoiding change in the heat transfer coefficient. The above is achieved by incorporating into urethane compositions the particular three-component flame-retarding systems in accordance herewith which effectively reduce to a substantial extent the ability of the final urethanes as noted herein to ignite when placed adjacent to flame and to eliminate any subsequent burning from such exposure to flame. Furthermore, because of the wide range of substances which can comprise the three-component systems in accordance herewith a variety of applications may be made, and a substantial reduction in cost is achieved thus making the compositions and the formulation highly advantageous commercially.

While the methods and compositions herein disclosed form preferred embodiments of the invention, this invention is not limited to those specific methods and compositions, and changes can be made therein without departing from the scope of this invention which is defined in the appended claims.

What is claimed is:

1. A plural component composition as a flame-retardant system for urethane polymers, and comprising within the range of between about 50–60 percent by weight of the said composition an inert filler selected from the group consisting of staurolite, perlite, silicon dioxide sand, antimony trioxide glass, a fused glass composition of antimony trioxide and a borate, aluminum silicate, zircon, barytes, colemanite, antimony pentoxide and mixtures thereof; within the range of between about 25–30 percent by weight of said composition a halogen source selected from the group consisting of a chlorinated paraffin, chlorinated polyethylene, and bromophenols; and within the range of between about 10–15 percent by weight of said composition a phosphorus-containing compound selected from the group consisting of hydrated calcium phosphate, ammonium phosphate, tricresyl phosphate and triphenyl phosphine oxide.

2. A plural component flame-retardant composition as recited in claim 1 in which said inert filler is 58 percent by weight of said composition, said halogen source is 29 percent by weight of said composition, and said phosphorus-containing compound is 12 percent by weight of said composition.

3. A composition as described in claim 1 in which the individual particles of the said inert filler are coated with said halogen source, and the said coated particles have disposed on the surfaces thereof the said phosphorus-containing compound.

4. A composition as described in claim 1 in which said halogen source is perchloropentacyclodecane.

5. A composition as described in claim 1 in which said inert filler is staurolite, said halogen source is a chlorinated paraffin and said phosphorus-containing compound is hydrated calcium phosphate.

6. A composition as described in claim 1 in which said inert filler is silicon dioxide, said halogen source is a chlorinated paraffin, and said phosphorus-containing compound is ammonium phosphate.

7. A composition as described in claim 1 in which said inert filler is silicon dioxide, said halogen source is a chlorinated paraffin, and said phosphorus-containing compound is triphenyl phosphine oxide.

8. In a method for producing a plural component composition as a flame-retardant system for urethane polymers, the steps which comprise charging to a mixing zone an amount within the range of between about 50–60 percent by weight of the final composition an inert filler selected from the group consisting of staurolite, perlite, silicon dioxide sand, antimony trioxide glass, a fused glass composition of antimony trioxide and a borate, aluminum silicate, zircon, barytes, colemanite, antimony pentoxide and mixtures thereof an amount within the range of between about 25–30 percent by weight of the final composition a halogen source selected from the group consisting of a chlorinated paraffin, chlorinated polyethylene, and bromophenols; and an amount within the range of between about 10–15 percent by weight of the final composition a phosphorus-containing compound selected from the group consisting of hydrated calcium phosphate, ammonium phosphate, tricresyl phosphate and triphenyl phosphine oxide, and thoroughly admixing in said mixing zone said filler, said halogen source and said phosphorus-containing compound to produce said flame-retardant system.

9. A method as recited in claim 8 in which said charging step is carried out by charging said mixing zone with 58 percent by weight of said composition said inert filler, with 29 percent by weight of said composition said halogen source, and 12 percent by weight of said composition said phosphorus-containing compound.

10. In a method for producing a plural component composition as a flame-retardant system for urethane polymers, the steps which comprise admixing in a mixing zone in the presence of heat an amount within the range of between about 50-60 percent by weight of the final composition an inert filler selected from the group consisting of staurolite, perlite, silicon dioxide sand, antimony trioxide glass, a fused glass composition of antimony trioxide and a borate, aluminum silicate, zircon, barytes, colemanite, antimony pentoxide and mixtures thereof; and an amount within the range of between about 25-30 percent by weight of the final composition a halogen source selected from the group consisting of a chlorinated paraffin, chlorinated polyethylene, and bromophenols; increasing the temperature in said mixing zone to a level within the range of the melting point of said halogen source, coating the individual particles of said filler with said halogen source; and introducing into said mixing zone an amount within the range of between about 10-15 percent by weight of the final composition a phosphorus-containing compound selected from the group consisting of hydrated calcium phosphate, ammonium phosphate, tricresyl phosphate and triphenyl phosphine oxide for admixture with said coated particles and adherence thereto.

11. A method as described in claim 10 in which said admixing step is carried out by the addition of 58 percent by weight of said final composition inert filler, and 29 percent by weight of said final composition the halogen source, and in which said introducing step is carried out by the addition of 12 percent by weight of said final composition said phosphorus-containing compound.

12. A method as described in claim 10 in which said inert filler is staurolite and said phosphorus-containing compound is hydrated calcium phosphate.

13. A method as described in claim 10 in which said admixing step is carried out at about 50° C., and the range of temperature of the melting point of said halogen source is between about 70°-75° C.

14. A method as described in claim 10 in which said halogen source is a chlorinated paraffin.

15. A method as described in claim 10 in which said halogen source is perchloropentacyclodecane.

16. A method as described in claim 10 in which said inert filler is silicon dioxide sand, said halogen source is a chlorinated paraffin, and said phosphorus-containing compound is ammonium phosphate.

17. A method as described in claim 10 in which said inert filler is silicon dioxide sand, said halogen source is a chlorinated paraffin, and said phosphorus-containing compound is triphenyl phosphine oxide.

* * * * *